US012620197B2

(12) United States Patent
Shangguan et al.

(10) Patent No.: US 12,620,197 B2
(45) Date of Patent: May 5, 2026

(54) IMAGE PROCESSING METHOD, APPARATUS, COMPUTING DEVICE, AND MEDIUM

(71) Applicant: BOE Technology Group Co., Ltd., Beijing (CN)

(72) Inventors: Zeyu Shangguan, Beijing (CN); Tong Liu, Beijing (CN); Guangwei Huang, Beijing (CN); Fanhao Kong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 322 days.

(21) Appl. No.: 18/281,685

(22) PCT Filed: Nov. 17, 2021

(86) PCT No.: PCT/CN2021/131260
§ 371 (c)(1),
(2) Date: Sep. 12, 2023

(87) PCT Pub. No.: WO2023/087184
PCT Pub. Date: May 25, 2023

(65) Prior Publication Data
US 2024/0153240 A1 May 9, 2024

(51) Int. Cl.
*G06T 7/90* (2017.01)
*G06V 10/56* (2022.01)
(Continued)

(52) U.S. Cl.
CPC .............. *G06V 10/761* (2022.01); *G06T 7/90* (2017.01); *G06V 10/56* (2022.01); *G06V 10/751* (2022.01);
(Continued)

(58) Field of Classification Search
CPC .... G06V 10/761; G06V 10/56; G06V 10/751; G06V 10/764; G06V 10/776;
(Continued)

(56) References Cited

U.S. PATENT DOCUMENTS 9,953,679 B1 * 4/2018 Tse ..................... G11B 27/3027
2002/0028021 A1 3/2002 Foote et al.
(Continued)

FOREIGN PATENT DOCUMENTS

CN 109947991 A 6/2019
CN 111709873 A 9/2020
(Continued)

OTHER PUBLICATIONS

CN 202180003422.2 first office action dated May 21, 2025.
PCT/CN2021/131260 international search report.
PCT/CN2021/131260 Written Opinion.

*Primary Examiner* — Ali Bayat
(74) *Attorney, Agent, or Firm* — IPro, PLLC

(57) ABSTRACT

The present disclosure provides an image processing method, an apparatus, a computing device, and a medium, which relates to deep learning technology. In the present disclosure, after acquiring the to-be-processed target image, the first similarities between the target image and the first images of categories are determined based on the first feature vector corresponding to the target image and the second feature vectors respectively corresponding to the plurality of first images. Moreover, based on the first color distribution information of the target region in the target image and the second color distribution information of the target regions in the plurality of first images, the second similarities between the target image and the plurality first images are determined, so that the image category to which
(Continued)

```
                          ┌─────────────────────────────────────────┐ ⌐ 101
                          │   Acquire a to-be-processed target image  │
                          └─────────────────────────────────────────┘
                                            │
                                            ▼
   ┌──────────────────────────────────────────────────────────────────┐ ⌐ 102
   │ Determine first similarities between the target image and first images of categories │
   │ based on a first feature vector corresponding to the target image and second feature │
   │ vectors respectively corresponding to a plurality of first images, wherein the plurality of │
   │ first images have been labeled with image categories, and the plurality of first images │
   │ correspond to the plurality of image categories │
   └──────────────────────────────────────────────────────────────────┘
                                            │
                                            ▼
   ┌──────────────────────────────────────────────────────────────────┐ ⌐ 103
   │ Determine second similarities between the target image and the plurality of first images │
   │ based on first color distribution information of a target region in the target image and │
   │ second color distribution information of target regions in the plurality of first images │
   └──────────────────────────────────────────────────────────────────┘
                                            │
                                            ▼
   ┌──────────────────────────────────────────────────────────────────┐ ⌐ 104
   │ Determine an image category to which the target image belongs from the image │
   │ categories of the plurality of first images based on the first similarities and the second │
   │ similarities │
   └──────────────────────────────────────────────────────────────────┘
``` the target image belongs can be determined jointly based on the first similarities and the second similarities.

19 Claims, 5 Drawing Sheets

(51) Int. Cl.

| | |
|---|---|
| *G06V 10/74* | (2022.01) |
| *G06V 10/75* | (2022.01) |
| *G06V 10/764* | (2022.01) |
| *G06V 10/776* | (2022.01) |

(52) U.S. Cl.
CPC .......... *G06V 10/764* (2022.01); *G06V 10/776* (2022.01); *G06T 2207/10024* (2013.01); *G06T 2207/20081* (2013.01)

(58) Field of Classification Search
CPC . G06V 10/82; G06T 7/90; G06T 2207/10024; G06T 2207/20081; G06F 16/73; G06F 16/783

USPC ......................................................... 382/159
See application file for complete search history.

(56)                References Cited

U.S. PATENT DOCUMENTS

| | | | |
|---|---|---|---|
| 2019/0095465 A1* | 3/2019 | Zhai ...................... | G06V 10/761 |
| 2020/0320348 A1* | 10/2020 | Yang ...................... | G06F 40/216 |
| 2021/0125055 A1* | 4/2021 | Trim ......................... | G06N 3/08 |
| 2021/0158072 A1* | 5/2021 | Zhang ................... | G06V 10/764 |
| 2021/0382936 A1* | 12/2021 | Tomar ................ | G06F 16/5854 |
| 2022/0261972 A1* | 8/2022 | Wang ........................ | G06N 3/04 |
| 2023/0206504 A1* | 6/2023 | Shin ...................... | G06T 11/001 382/162 |
| 2024/0152747 A1* | 5/2024 | Liu .......................... | G06N 3/08 |

FOREIGN PATENT DOCUMENTS

| | | |
|---|---|---|
| CN | 111986785 A | 11/2020 |
| CN | 112925938 A | 6/2021 |

\* cited by examiner

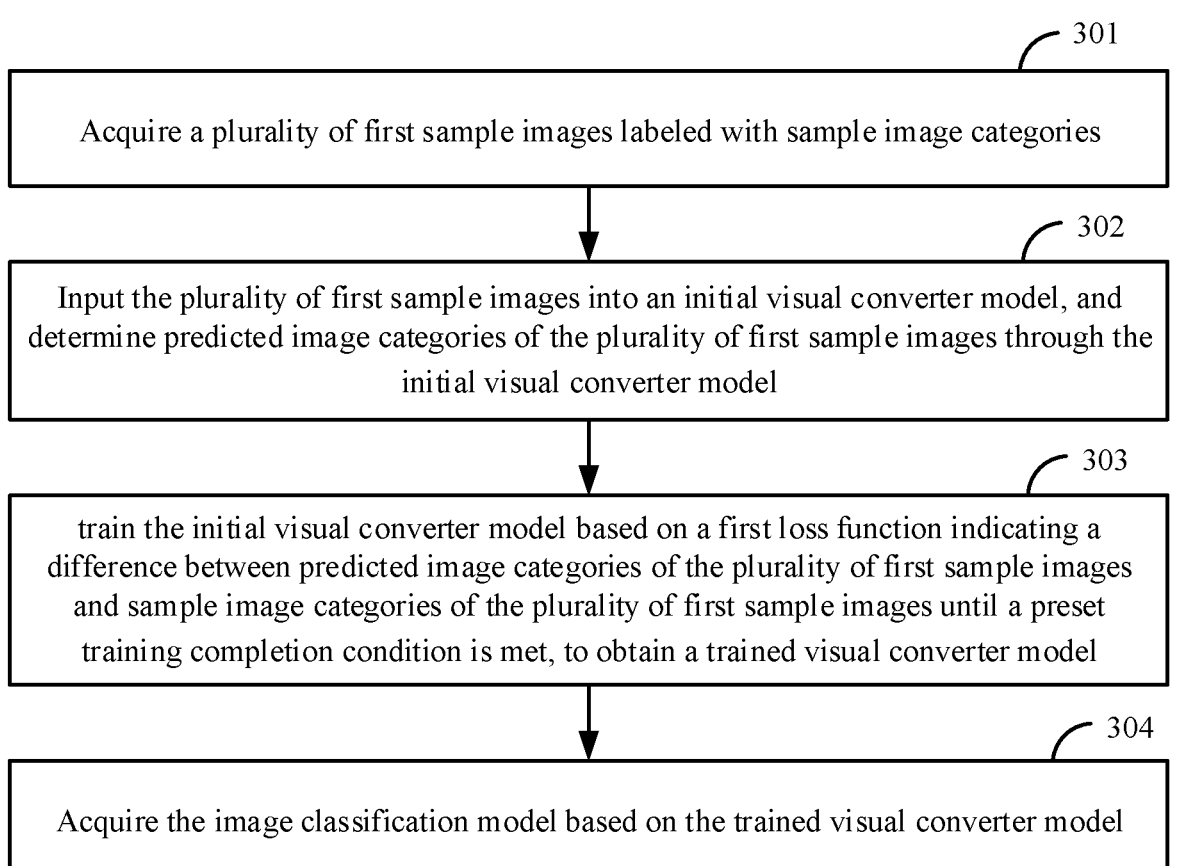

301

Acquire a plurality of first sample images labeled with sample image categories

302

Input the plurality of first sample images into an initial visual converter model, and determine predicted image categories of the plurality of first sample images through the initial visual converter model

303 train the initial visual converter model based on a first loss function indicating a difference between predicted image categories of the plurality of first sample images and sample image categories of the plurality of first sample images until a preset training completion condition is met, to obtain a trained visual converter model

304

Acquire the image classification model based on the trained visual converter model

Fig. 3

IMAGE PROCESSING METHOD, APPARATUS, COMPUTING DEVICE, AND MEDIUM

CROSS-REFERENCE TO RELATED APPLICATIONS

The present application is a U.S. National Phase of International Application No. PCT/CN2021/131260, filed Nov. 17, 2021, the entire contents of which are hereby incorporated by reference for all purposes.

TECHNICAL FIELD

The present disclosure relates to the field of deep learning technology, and more particularly, to an image processing method, an image processing apparatus, an electronic device, and a medium.

BACKGROUND

With continuous development of deep learning, image classification, segmentation, and recognition through deep learning have become an important technical means in image processing. However, due to a high cost of image sample collection and even inability to collect certain image samples, a training effect of an image classification model is undesirable, resulting in low accuracy in image classification.

In view of this, a small sample learning scheme has been proposed. The so-called small sample learning refers to using a much smaller sample size than a required sample size for deep learning of big data, while achieving a processing effect that is close to or even beyond that of deep learning of big data. Through small sample learning, an image classification model with high accuracy can be obtained in the case of limited image samples.

In related art, a main approach is to train a Convolutional Neural Network (CNN) by collecting public image samples which can be sampled with lower difficulty, to obtain a pre-trained model. Then, the pre-trained model is trained on image samples corresponding to actual image classification requirements, to obtain an image classification model that can meet actual image classification requirements.

In the above implementation, due to a large number of categories and images in the sample images, as well as a significant variation in sizes of sample images of a same category, and a lot of potential noises in the sample images, a training effect of the model is undesirable, which in turn leads to an undesirable classification accuracy in the trained image classification model.

SUMMARY

The present disclosure provides an image processing method, an apparatus, a computing device, and a medium, to solve the deficiency in the related art.

According to a first aspect of the embodiments of the present disclosure, there is provided an image processing method including:

acquiring a to-be-processed target image;

determining first similarities between the target image and first images of categories based on a first feature vector corresponding to the target image and second feature vectors respectively corresponding to a plurality of first images, wherein the plurality of first images have been labeled with image categories, and the plurality of first images correspond to the plurality of image categories;

determining second similarities between the target image and the plurality of first images based on first color distribution information of a target region in the target image and second color distribution information of target regions in the plurality of first images;

determining an image category to which the target image belongs from the image categories of the plurality of first images based on the first similarities and the second similarities.

In an embodiment of the present disclosure, the color distribution information is a color distribution spectrum; determining second similarities between the target image and the plurality of first images based on first color distribution information of a target region in the target image and second color distribution information of target regions in the plurality of first images includes:

respectively determining a color distribution similarity between the first color distribution spectrum and each of the second color distribution spectra;

for at least one first image belonging to any one image category, determining a color distribution similarity with the largest value in the color distribution similarities corresponding to the at least one first image as a second similarity between the target image and the at least one first image.

In an embodiment of the present disclosure, prior to determining second similarities between the target image and the plurality of first images based on first color distribution information of a target region in the target image and second color distribution information of target regions in the plurality of first images, the method further includes:

determining target regions respectively from the target image and the plurality of first images based on an attention matrix of an image classification model;

acquire the first color distribution information of the target region in the target image, and the second color distribution information of the target region in each of the first images.

In an embodiment of the present disclosure, the first similarity is a cosine similarity, which is used to indicate a cosine distance between the feature vector of the target image and the feature vector of the first images of each category;

prior to determining first similarities between the target image and first images of categories based on a first feature vector corresponding to the target image and second feature vectors respectively corresponding to a plurality of first images, the method includes:

determining a first vector sequence for representing the target image and a plurality of second vector sequences for representing the plurality of first images through an embedding layer of an image classification model based on the target image and the plurality of first images;

obtaining the first feature vector and the plurality of second feature vectors through an encoder of the image classification model based on the first vector sequence and the plurality of second vector sequences, and determining cosine similarities between the target image and the plurality of first images based on the first feature vector and the plurality of second feature vectors.

In an embodiment of the present disclosure, obtaining the first feature vector and the plurality of second feature vectors through an encoder of the image classification model based on the first vector sequence and the plurality of second vector sequences, and determining cosine similarities between the target image and the plurality of first images based on the first feature vector and the plurality of second feature vectors including:

inputting the first vector sequence and the plurality of second vector sequences to the encoder, and through the encoder, determining the first feature vector corresponding to the first vector sequence and the plurality of second feature vectors corresponding to the plurality of second vector sequences;

for at least one first image belonging to any one image category, determining a mean vector of the second feature vectors corresponding to the at least one first image;

determining a cosine distance between the first feature vector and the mean vector, and determining a cosine similarity between the target image and the at least one first image based on the cosine distance.

In an embodiment of the present disclosure, determining a cosine similarity between the target image and the plurality of first images based on the cosine distance including any one of:

when the cosine distance is greater than a preset distance threshold, determining the cosine similarity as a first value;

when the cosine distance is less than or equal to the preset distance threshold, determining the cosine similarity as a second value.

In an embodiment of the present disclosure, determining an image category to which the target image belongs from the image categories of the plurality of first images based on the first similarities and the second similarities includes:

based on a first weight corresponding to the first similarity and a second weight corresponding to the second similarity, calculating a weighted sum of the first similarity and the second similarity to obtain an image similarity between the target image and the first images of each category;

determining an image category corresponding to a largest similarity of the target image among the image similarities as the image category to which the target image belongs.

In an embodiment of the present disclosure, the image classification model is pre-trained;

a process of training the image classification model includes:

acquiring a plurality of first sample images labeled with sample image categories;

inputting the plurality of first sample images into an initial visual converter model, and determining predicted image categories of the plurality of first sample images through the initial visual converter model;

training the initial visual converter model based on a first loss function indicating a difference between predicted image categories of the plurality of first sample images and sample image categories of the plurality of first sample images until a preset training completion condition is met, to obtain a trained visual converter model;

acquiring the image classification model based on the trained visual converter model.

In an embodiment of the present disclosure, the trained visual converter model includes an embedding layer, a converter encoder, and a multi head perceptron;

acquiring the image classification model based on the trained visual converter model includes:

acquiring an embedding layer and a converter encoder from the trained visual converter model to form an initial image classification model;

acquiring a plurality of second sample images labeled with similarity truth values;

for any two second sample images among the plurality of second sample images, inputting the two second sample images into the initial image classification model, and outputting a first similarity prediction value of the two second sample images from the initial image classification model;

training the initial image classification model based on a second loss function indicating a difference between the first similarity prediction value and the similarity truth value.

In an embodiment of the present disclosure, the method further includes:

determining a second similarity prediction result between color distribution information of the target regions in two second sample images based on an attention matrix of the initial image classification model;

determining a second similarity prediction value based on the second similarity prediction result and a preset similarity threshold;

training the initial image classification model based on a second loss function indicating a difference between the first similarity prediction value and the similarity truth value and a third loss function indicating a difference between the second similarity prediction value and the similarity truth value.

In an embodiment of the present disclosure, determining a second similarity prediction value based on the second similarity prediction result and a preset similarity threshold includes any one of:

when the second similarity prediction result is greater than the preset similarity threshold, determining the second similarity prediction value as a first value;

when the second similarity prediction result is less than or equal to the preset similarity threshold, determining the second similarity prediction value as a second value.

In an embodiment of the present disclosure, training the initial image classification model based on a second loss function indicating a difference between the first similarity prediction value and the similarity truth value and a third loss function indicating a difference between the second similarity prediction value and the similarity truth value includes:

calculating a weighted sum of the second loss function and the third loss function to obtain a target loss function based on a first initial weight corresponding to the second loss function and a second initial weight corresponding to the third loss function;

training the initial image classification model based on the target loss function until a training completion condition is met to obtain the image classification model.

According to a second aspect of the embodiments of the present disclosure, there is provided an image processing apparatus including:

an image acquisition module configured to acquire a to-be-processed target image;

a similarity determination module configured to determine first similarities between the target image and first images of categories based on a first feature vector corresponding to the target image and second feature vectors respectively corresponding to a plurality of first images, wherein the plurality of first images have been labeled with image categories, and the plurality of first images correspond to the plurality of image categories;

the similarity determination module being further configured to determine second similarities between the target image and the plurality of first images based on first color distribution information of a target region in the target image and second color distribution information of target regions in the plurality of first images;

a category determination module configured to determine an image category to which the target image belongs from the image categories of the plurality of first images based on the first similarities and the second similarities.

In one embodiment of the present disclosure, the color distribution information is a color distribution spectrum.

The similarity determination module, when being configured to determine second similarities between the target image and the plurality of first images based on first color distribution information of a target region in the target image and second color distribution information of target regions in the plurality of first images, is configured:

respectively determine a color distribution similarity between the first color distribution spectrum and each of the second color distribution spectra;

for at least one first image belonging to any one image category, determine a color distribution similarity with the largest value in the color distribution similarities corresponding to the at least one first image as a second similarity between the target image and the at least one first image.

In one embodiment of the present disclosure, the apparatus further includes:

a region determination module configured to determine target regions respectively from the target image and the plurality of first images based on an attention matrix of an image classification model;

an information acquisition module configured to acquire the first color distribution information of the target region in the target image, and the second color distribution information of the target region in each of the first images.

In an embodiment of the present disclosure, the first similarity is a cosine similarity, which is used to indicate a cosine distance between the first feature vector corresponding to the target image and the second feature vectors corresponding to the first images of each category.

The similarity determination module, when being configured to determine first similarities between the target image and first images of categories based on a first feature vector corresponding to the target image and second feature vectors respectively corresponding to a plurality of first images, includes a sequence determination submodule and a similarity determination submodule.

The sequence determination submodule is configured to determine a first vector sequence for representing the target image and a plurality of second vector sequences for representing the plurality of first images through an embedding layer of an image classification model based on the target image and the plurality of first images.

The similarity determination submodule is configured to obtain the first feature vector and the plurality of second feature vectors through an encoder of the image classification model based on the first vector sequence and the plurality of second vector sequences, and determine cosine similarities between the target image and the plurality of first images based on the first feature vector and the plurality of second feature vectors.

In one embodiment of the present disclosure, the similarity determination submodule, when being configured to obtain the first feature vector and the plurality of second feature vectors through an encoder of the image classification model based on the first vector sequence and the plurality of second vector sequences, and determine cosine similarities between the target image and the plurality of first images based on the first feature vector and the plurality of second feature vectors, includes a vector determination unit, a distance determination unit and a similarity determination unit.

The vector determination unit is configured to input the first vector sequence and the plurality of second vector sequences to the encoder, and through the encoder, determine the first feature vector corresponding to the first vector sequence and the plurality of second feature vectors corresponding to the plurality of second vector sequences.

The vector determination unit is further configured to, for at least one first image belonging to any one image category, determine a mean vector of the second feature vectors corresponding to the at least one first image.

The distance determination unit is configured to determine a cosine distance between the first feature vector and the mean vector.

The similarity determination unit is configured to determine a cosine similarity between the target image and the at least one first images based on the cosine distance.

In one embodiment of the present disclosure, the similarity determination unit, when being configured to determine the cosine similarity between the target image and the plurality of first images based on cosine distance, is configured to perform any one of:

when the cosine distance is greater than the preset distance threshold, determining the cosine similarity as a first value;

when the cosine distance is less than or equal to aa preset distance threshold, determining the cosine similarity as a second value.

In one embodiment of the present disclosure, the category determination module, when being configured to determine an image category to which the target image belongs from the image categories of the plurality of first images based on the first similarities and the second similarities, is configured to:

based on a first weight corresponding to the first similarity and a second weight corresponding to the second similarity, calculate a weighted sum of the first similarity and the second similarity to obtain an image similarity between the target image and the first images of each category;

determine an image category corresponding to a largest similarity of the target image among the image similarities as the image category to which the target image belongs.

In one embodiment of the present disclosure, the image classification model is pre-trained.

The apparatus further includes:

a sample acquisition module configured to acquire a plurality of first sample images labeled with sample image categories;

a sample category determination module configured to input the plurality of first sample images into an initial visual converter model, and determine predicted image categories of the plurality of first sample images through the initial visual converter model;

a training module configured to train the initial visual converter model based on a first loss function indicating a difference between predicted image categories of the plurality of first sample images and sample image categories of the plurality of first sample images until a preset training completion condition is met, to obtain a trained visual converter model;

a model acquisition module configured to acquire the image classification model based on the trained visual converter model.

In one embodiment of the present disclosure, the trained visual converter model includes an embedding layer, a converter encoder, and a multi head perceptron.

The model acquisition module, when being configured to acquire an image classification model based on the trained visual converter model, includes a model acquisition submodule, a sample acquisition submodule, a first prediction submodule, and a first training submodule.

The model acquisition submodule is configured to acquire an embedding layer and a converter encoder from the trained visual converter model to form an initial image classification model.

The sample acquisition submodule is configured to acquire a plurality of second sample images labeled with similarity truth values.

The first prediction submodule is configured to, for any two second sample images among the plurality of second sample images, input the two second sample images into the initial image classification model, and output a first similarity prediction value of the two second sample images from the initial image classification model.

The first training submodule is configured to train the initial image classification model based on a second loss function indicating a difference between the first similarity prediction value and the similarity truth value.

In one embodiment of the present disclosure, the model acquisition module further includes a result determination submodule, a second prediction submodule, and a second training submodule.

The result determination submodule is configured to determine a second similarity prediction result between color distribution information of the target regions in two second sample images based on an attention matrix of the initial image classification model.

The second prediction submodule is configured to determine a second similarity prediction value based on the second similarity prediction result and a preset similarity threshold.

The second training submodule is configured to train the initial image classification model based on a second loss function indicating a difference between the first similarity prediction value and the similarity truth value and a third loss function indicating a difference between the second similarity prediction value and the similarity truth value.

In one embodiment of the present disclosure, the second prediction submodule, when being configured to determine a second similarity prediction value based on the second similarity prediction result and a preset similarity threshold, is configured to perform any one of:

when the second similarity prediction result is greater than the preset similarity threshold, determining the second similarity prediction value as a first value;

when the second similarity prediction result is less than or equal to the preset similarity threshold, determining the second similarity prediction value as a second value.

In one embodiment of the present disclosure, the second training submodule, when being configured to the initial image classification model based on a second loss function indicating a difference between the first similarity prediction value and the similarity truth value and a third loss function indicating a difference between the second similarity prediction value and the similarity truth value, is configured to:

calculate a weighted sum of the second loss function and the third loss function to obtain a target loss function based on a first initial weight corresponding to the second loss function and a second initial weight corresponding to the third loss function;

train the initial image classification model based on the target loss function until a training completion condition is met to obtain the image classification model.

According to a third aspect of the embodiments of the present disclosure, there is provided a computing device, including a memory, a processor, and a computer program stored in the memory and capable of running on the processor, wherein the processor executes the computer program to implement operations of the image processing method provided in any one embodiment of the first aspect and the second aspect.

According to a fourth aspect of the embodiments of the present disclosure, there is provided a computer-readable storage medium, wherein a program is stored on the computer-readable storage medium, and when the program is executed by a processor, the operations of the image processing method provided in any one embodiment of the first aspect and the second aspect.

According to a fifth aspect of the embodiments of the present disclosure, there is provided a computer program product, including a computer program that, when executed by a processor, implements the operations of the image processing method provided in any one embodiment of the first aspect and the second aspect.

It can be seen from the above embodiments, in the present disclosure, after acquiring the to-be-processed target image, the first similarities between the target image and the first images of categories are determined based on the first feature vector corresponding to the target image and the second feature vectors respectively corresponding to the plurality of first images. Moreover, based on the first color distribution information of the target region in the target image and the second color distribution information of the target regions in the plurality of first images, the second similarities between the target image and the plurality first images are determined, so that the image category to which the target image belongs can be determined jointly based on the first similarities and the second similarities. By introducing the second similarities determined based on color distribution information as a supplementary basis for determining the image category, the accuracy in determining the image category can be higher, thereby improving the accuracy in image classification.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 3 is a flowchart illustrating training an image classification model according to an embodiment of the present disclosure;

DETAILED DESCRIPTION

Figure 1:
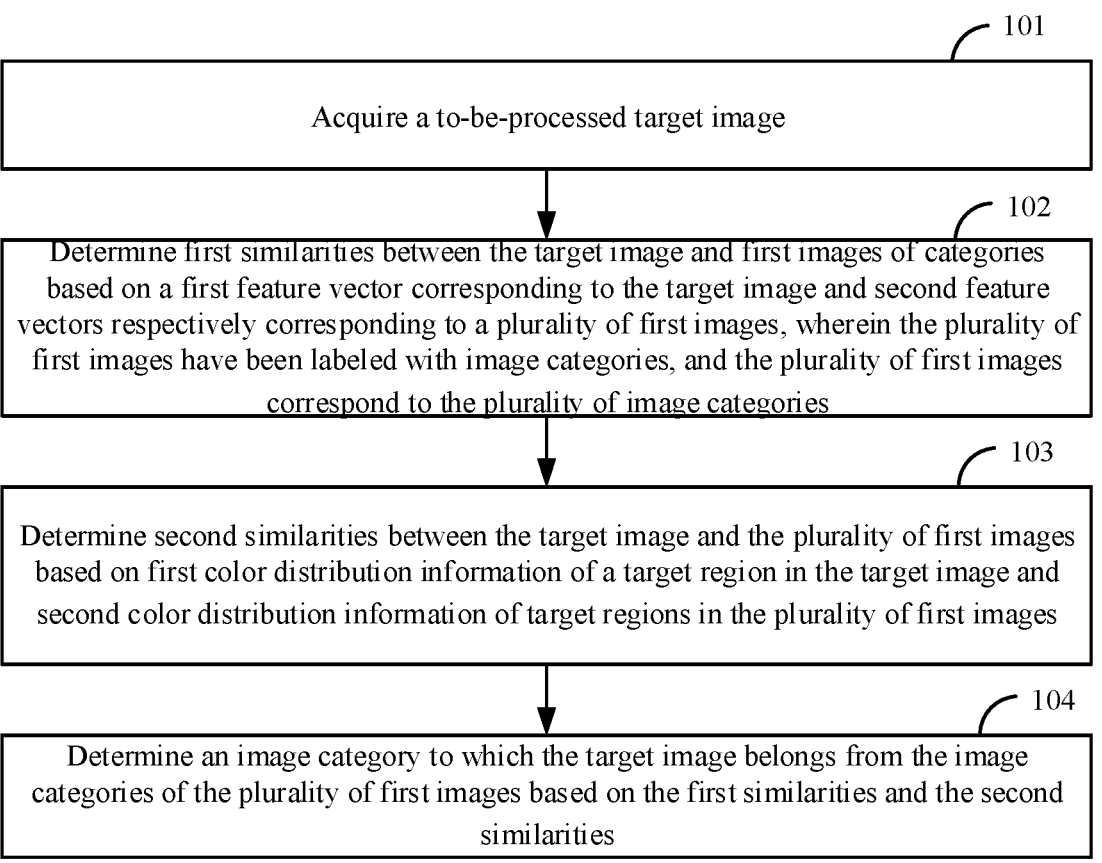
FIG. 1 is a flowchart illustrating an image processing method according to an embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The implementations described in the following exemplary embodiments do not represent all implementations consistent with the present disclosure. Rather, they are merely examples of apparatuses and methods consistent with some aspects of the present disclosure as detailed in the appended claims.

The present disclosure provides an image processing method for determining an image category to which a to-be-processed target image belongs. Here, the target image can be various types of images, such as an object image, an animal image, and so on. The present disclosure does not limit this. Taking the target image being an object image as an example, an image category to which the target image belongs is determined, that is, a category of the object contained in the target image is determined. For example, if the object contained in the target image is a vacuum cup, the image category to which the target image belongs is a vacuum cup image. Taking the target image being an animal image as an example, the image category to which the target image belongs is determined, that is, a category of the animal contained in the target image is determined. For example, if the animal included in the target image is a Northeast tiger, then the image category to which the target image belongs is a Northeast tiger image.

The above image processing method can be performed by a computing device, which can be a server, such as one server, the plurality of servers, a server cluster, a cloud computing platform, and so on. Optionally, the computing device can also be a terminal device, such as a mobile phone, a tablet, a game console, a laptop, a desktop, an advertising machine, an all-in-one machine, and so on. The present disclosure does not limit the type and quantity of computing device.

The above is an exemplary explanation of an application scenario of the present disclosure and does not constitute a limitation on the application scenario of the present disclosure. In more possible implementations, the present disclosure can be applied to image processing of various types of target images.

After introducing the application scenarios of the present disclosure, the following will provide a detailed explanation of the image processing method provided by the present disclosure in conjunction with some optional embodiments.

FIG. 1 is a flowchart illustrating an image processing method according to an embodiment of the present disclosure. As shown in FIG. 1, the method includes the following steps.

In step 101, a to-be-processed target image is acquired.

In one possible implementation, a computing device receives an image processing instruction triggered by a user, in response to the image processing instruction, acquires the to-be-processed target image, and triggers subsequent image processing.

Here, the computing device acquires the to-be-processed target image from an associated image database, and also receives an image sent by a further device, taking the received image as the to-be-processed target image.

In another possible implementation, the computing device uses the received image as the to-be-processed target image after receiving the image sent by a further device, thereby triggering subsequent image processing.

The above are two exemplary ways to trigger the image processing. In more possible implementations, other methods can also be used to trigger the image processing, and the present disclosure does not limit this.

In step 102, first similarities between the target image and first images of categories are determined based on a first feature vector corresponding to the target image and second feature vectors respectively corresponding to a plurality of first images, where the plurality of first images have been labeled with image categories, and the plurality of first images correspond to the plurality of image categories.

In step 103, second similarities between the target image and the plurality of first images are determined based on first color distribution information of a target region in the target image and second color distribution information of target regions in the plurality of first images.

Here, both the target image and the first images contain a plurality of types of information, but among these various types of information, some of the information assists in determining the image category, while other irrelevant information cannot assist in determining the image category. The target region in the target image is a region in the target image that contains information that assists in determining the image category. The target region in the first image is a region in the first image that contains information that assists in determining the image category. Optionally, the target region is also referred to as a region of interest.

In step 104, an image category to which the target image belongs is determined from the image categories of the plurality of first images based on the first similarities and the second similarities.

In the present disclosure, after acquiring the to-be-processed target image, the first similarities between the target image and the first images of categories are determined based on the first feature vector corresponding to the target image and the second feature vectors respectively corresponding to the plurality of first images. Moreover, based on the first color distribution information of the target region in the target image and the second color distribution information of the target regions in the plurality of first images, the second similarities between the target image and the plurality first images are determined, so that the image category to which the target image belongs is determined jointly based on the first similarities and the second similarities. By introducing the second similarities determined based on color distribution information as a supplementary basis for determining the image category, the accuracy in determining the image category can be higher, thereby improving the accuracy in image classification.

After introducing the basic implementation of the present disclosure, some non-limiting embodiments of the present disclosure will be described below.

In one implementation of the present disclosure, the first similarity involved in the step 102 is a cosine similarity, which is used to indicate a cosine distance between the first
feature vector corresponding to the target image and the
second feature vectors corresponding to the first images of
each category.

When the first similarity is a cosine similarity, an image
classification model is used to determine the cosine simi-
larity between the target image and the first images of each
category, to obtain the first similarity between the target
image and the first images of each category. That is to say,
the step 102 is implemented by an image classification
model.

Here, the image classification model is a Vision Trans-
former model, and optionally, the image classification model
is also other types of models, which are not limited by the
present disclosure. Taking the image classification model
being a Vision Transformer model as an example, the image
classification model includes an embedding layer and a
transformer encoder. For ease of explanation, the converter
encoder is referred to as an encoder below.

When implementing the step 102 by an image classifica-
tion model, the process of determining the first similarities
between the target image and the first images of the catego-
ries based on the first feature vector corresponding to the
target image and the second feature vectors respectively
corresponding to the first images includes the following
steps.

In step 1021, a first vector sequence for representing the
target image and a plurality of second vector sequences for
representing the plurality of first images are determined
through the embedding layer of the image classification
model based on the target image and the plurality of first
images.

Determining the first vector sequence for representing the
target image and the plurality of second vector sequences for
representing the plurality of first images through the embed-
ding layer of the image classification model is implemented
as follows.

Taking the process of determining the first vector
sequence for representing the target image as an example,
through the embedding layer of the image classification
model, the target image is divided into a plurality of image
blocks that meet a preset size of the image block according
to the preset size of the image block. Then, linear mapping
is used to map each image block to a one-dimensional
vector, to obtain a corresponding one-dimensional vector of
each image block, and then concatenating the plurality of
one-dimensional vectors, to obtain the first vector sequence.

It should be noted that the determination process of each
second vector sequence is the same as that of the first vector
sequence, which will not be repeated here.

In step 1022, the first feature vector and the plurality of
second feature vectors are obtain through an encoder of the
image classification model based on the first vector sequence
and the plurality of second vector sequences, and cosine
similarities between the target image and the plurality of first
images are determined based on the first feature vector and
the plurality of second feature vectors.

In one possible implementation, the step 1022 is imple-
mented by the following steps.

In step 1, the first vector sequence and the plurality of
second vector sequences are input to the encoder, to deter-
mine the first feature vector corresponding to the first vector
sequence and the plurality of second feature vectors corre-
sponding to the plurality of second vector sequences through
the encoder.

In one possible implementation, the first vector sequence
and the plurality of second vector sequences are input to the encoder, and through the encoder, the first vector sequence
and the plurality of second vector sequences are convolu-
tionally processed to obtain the first feature vector corre-
sponding to the first vector sequence and the plurality of
second feature vectors corresponding to the plurality of
second vector sequences.

In step 2, for at least one first image belonging to any one
image category, a mean vector of the second feature vectors
corresponding to the at least one first image is determined.

It should be noted that the plurality of first images
correspond to the plurality of image categories, and each
category includes at least one first image. When determining
the mean vector, the mean vector of the second feature
vectors corresponding to the first images of each category is
determined separately, thereby obtaining the mean vector
corresponding to the first images of each category.

In one possible implementation, for at least one first
image belonging to any one image category, a mean of at
least one second feature vector corresponding to the first
images is calculated to obtain the mean vector of the at least
one second feature vector.

In step 3, a cosine distance between the first feature vector
and the mean vector is determined and the cosine similarity
between the target image and at least one first image is
determined based on the cosine distance.

Here, when determining the cosine distance between the
first feature vector and the mean vector, a cosine value of an
angle between the first feature vector and the mean vector is
determined first. By subtracting the determined cosine value
from 1, the cosine distance between the first feature vector
and the mean vector is obtained. That is to say, the cosine
distance between the first feature vector and the mean vector
is determined by the following formula (1):

$$\text{dist}(A,B)=1-\cos(A,B) \tag{1}$$

where A represents the first feature vector, B represents
the mean vector, dist(A, B) represents the cosine dis-
tance between the first feature vector and the mean
vector, and cos(A, B) represents the cosine value of the
angle between the first feature vector and the mean
vector.

When determining the cosine similarity between the tar-
get image and at least one first image based on the cosine
distance, the cosine distance is compared with a preset
distance threshold to determine the cosine similarity based
on the comparison result.

In one possible implementation, the cosine similarity is
determined as a first value when the cosine distance is
greater than the preset distance threshold.

In another possible implementation, the cosine similarity
is determined as a second value when the cosine distance is
less than or equal to the preset distance threshold.

Here, the preset distance threshold is any one positive
value, and the present disclosure does not limit the specific
value of the preset distance threshold. The first value is 0,
and the second value is 1.

By comparing the cosine distance with a preset distance
threshold, the cosine similarity is mapped to 0 or 1 based on
the comparison result, thereby implementing binary process-
ing of cosine similarity to highlight the cosine similarity
between two images and improve the accuracy in image
classification.

The steps 2 and 3 will illustrate the processing of the first
images of any one image category as an example. The
processing of the first images of different image categories
is the same, and the processing of the first images of other
image categories will not be repeated here.

When the Vision Transformer model is used as the image classification model, the encoder of the image classification model adopts an attention mechanism to determine the target region in the target image and the target regions in the first images based on this attention mechanism, so that the color distribution information of the target region needs to be determined later, and then the color distribution similarity is determined based on the color distribution information of the target regions, reducing workload on the computing device, thereby improving the processing speed and thus improving image classification speed.

In one possible implementation, the encoder of the image classification model includes an attention matrix, which is used to determine the target regions from the target image and the first images. That is to say, in step 103, before determining the second similarities between the target image and the plurality of first images based on the first color distribution information of the target region in the target image and the second color distribution information of the target regions in the plurality of first images, the method further includes the following steps.

In step 1, based on the attention matrix of the image classification model, the target regions are determined respectively from the target image and the plurality of first images.

Taking the process of determining the target region from the target image as an example, pixel values of the target image is multiplied by the attention matrix to obtain the target region in the target image. Here, in the attention matrix, the values of the matrix elements corresponding to the pixels included in the target region are 1, and the values of the matrix elements corresponding to the pixels not included in the target region are 0. Therefore, the determination of the target region is implemented by multiplying the pixel values of the target image with the attention matrix.

The above explanation takes the determination process of the target region in the target image as an example. The determination process of the target region in each first image is the same and will not be repeated here.

In step 2, the first color distribution information of the target region in the target image, and the second color distribution information of the target region in each of the first images are obtained.

Here, the color distribution information is a color distribution spectrum.

In one possible implementation, the RGB colors included in the target region of the target image and distribution positions of the colors is calculated to obtain the first color distribution spectrum of the target region in the target image, and the RGB colors included in the target region of each first image and the distribution positions of the colors is calculated to obtain the second color distribution spectra of the target regions in the plurality of first images.

After obtaining the first color distribution spectrum of the target region in the target image and the second color distribution spectrum of each target region in the first image, the second similarity is determined based on the obtained first color distribution spectrum and second color distribution spectrum.

In some embodiments, for step 103 above, based on first color distribution information of a target region in the target image and second color distribution information of target regions in the plurality of first images, determining second similarities between the target image and the plurality of first images is implemented by the following steps.

In step 1031, a color distribution similarity between the first color distribution spectrum and each of the second color distribution spectra is respectively determined.

In one possible implementation, for any one second color distribution spectrum among the plurality of second color distribution spectra, by comparing the RGB colors and the distribution position of each color indicated by the first color distribution spectrum, with the RGB colors and the distribution positions of each color indicated by any one second color distribution spectrum, to determine the color distribution similarity between the first color distribution spectrum and the any one second color distribution spectrum.

The above explanation takes the process of determining color distribution similarity between the first color distribution spectrum and any one second color distribution spectrum as an example, and the process of determining color distribution similarity between other second color distribution spectra and the first color distribution spectrum is the same, which will not be repeated here.

Optionally, after determining the color distribution similarity, the color distribution similarity is compared with a preset similarity threshold to implement binary processing of color distribution similarity.

In one possible implementation, when the color distribution similarity is greater than the preset similarity threshold, the color distribution similarity is determined as a first value.

In another possible implementation, when the color distribution similarity is less than or equal to the preset similarity threshold, the color distribution similarity is determined as a second value.

Here, the preset similarity threshold is any one positive value, and the present disclosure does not limit the specific value of the preset similarity threshold. The first value is 0, and the second value is 1.

By comparing the color distribution similarity with the preset similarity threshold, the color distribution similarity is mapped to 0 or 1 based on the comparison result, thereby implementing binary processing of the color distribution similarity to highlight the color distribution similarity between two images and improve the accuracy in image classification.

In step 1032, for at least one first image belonging to any one image category, a color distribution similarity with the largest value in the color distribution similarities corresponding to the at least one first image is determined as a second similarity between the target image and the at least one first image.

It should be noted that the plurality of first images correspond to the plurality of image categories, and each category includes at least one first image. When determining the second similarity between the target image and the plurality of first images, the second similarity between the target image and the first images of each category is determined separately.

In one possible implementation, for at least one first image belonging to any one category, after determining the color distribution similarities between the first color distribution spectrum and the at least one second color distribution spectrum corresponding to the at least one first image, the determined color distribution similarities are sorted in a descending order of values. Thus, the color distribution similarity ranking at the top (i.e. the color distribution similarity with the largest value) is determined as the second similarity between the target image and the first images of this category.

By introducing an attention mechanism in the image classification process and separating the attention matrix from the Transformer encoder of the image classification model, the attention matrix is applied to the unprocessed target image and the first image, allowing for more mining of image information contained in the target region of the target image and the target region of the first image. Furthermore, the color distribution information of the target region of the target image and the color distribution information of the target region of the first image are obtained. The color distribution information is used as a supplementary basis for determining similarity, which is intuitive, fast, and in line with human visual habits.

In one embodiment of the present disclosure, for the step 104, determining an image category to which the target image belongs from the image categories of the plurality of first images based on the first similarities and the second similarities is implemented by the following steps.

In step 1041, based on a first weight corresponding to the first similarity and a second weight corresponding to the second similarity, a weighted sum of the first similarity and the second similarity is calculated to obtain an image similarity between the target image and the first images of each category.

In one possible implementation, the image similarity between the target image and the first images of each category is determined by the following formula (2):

$$S = \alpha S_1 + \beta S_2 \qquad (2)$$

In formula (2) above, S represents the image similarity, S1 represents the first similarity, S2 represents the second similarity, $\alpha$ represents the first weight, and $\beta$ represents the second weight.

Here, the first and second weights are the weight values obtained through model training. The specific acquisition process will be explained in the following model training process, which will not be repeated here.

In step 1042, an image category corresponding to a largest similarity of the target image among the image similarities is determined as the image category to which the target image belongs.

Figure 2:
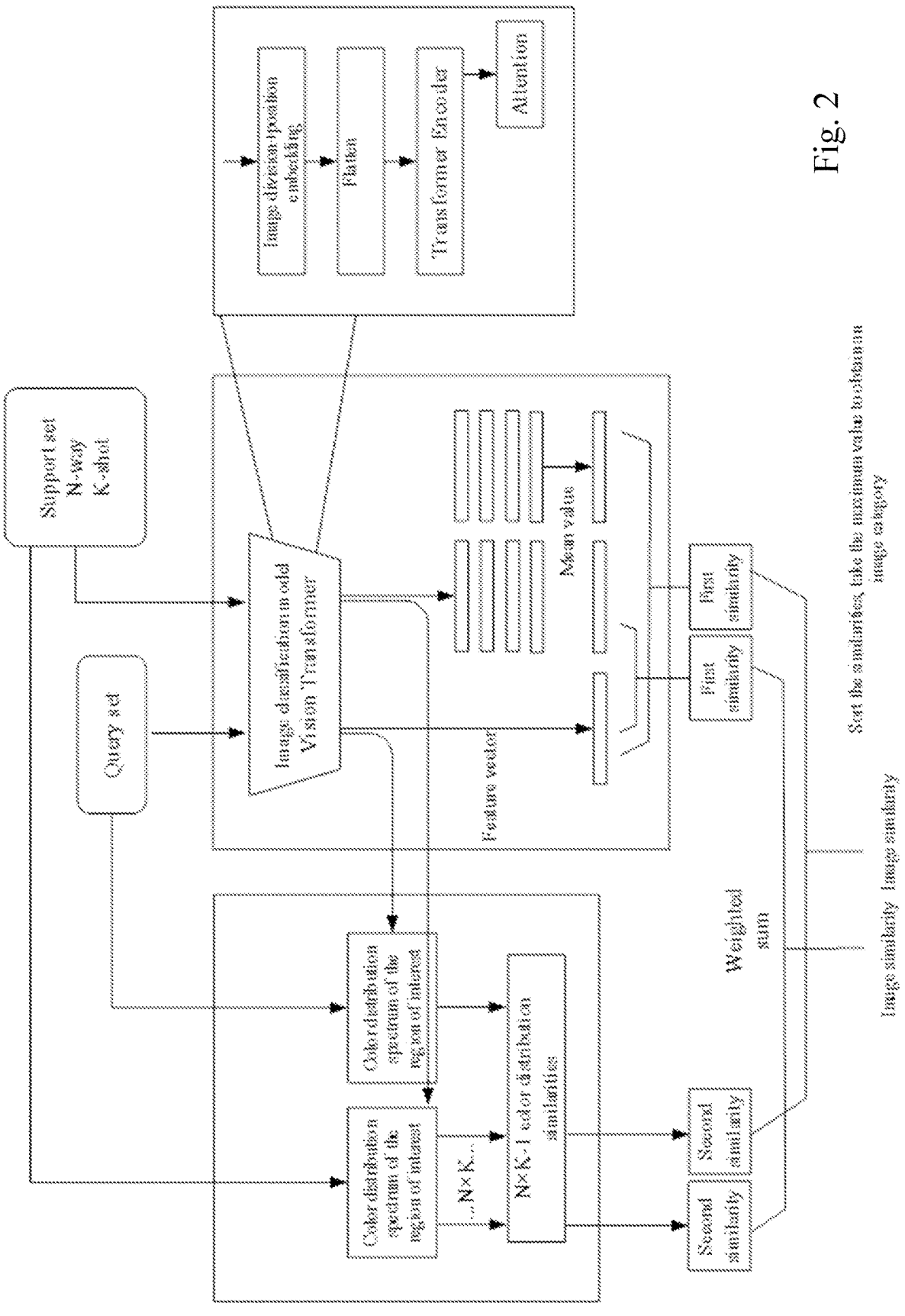
FIG. 2 is a flowchart illustrating an image processing method according to an embodiment of the present disclosure.

The image classification process described in the above embodiments is seen in FIG. 2, which is a flowchart illustrating an image processing method according to an embodiment of the present disclosure. The target image is an image in a query set, and the first image is an image in a support set. Through the image processing method provided by the present disclosure, the Vision Transformer, as an image classification model, processes both images in the query set and images in the support set respectively to obtain both a feature vector corresponding to the target image in the query set and feature vectors corresponding to the first images in the support set, and then calculates a mean value of the feature vectors corresponding to the first images in the support set, to obtain a mean vector corresponding to the first images in the support set, and determines a first similarity between the target image and the first images of each category based on the mean vector and the corresponding feature vector of the target image. The Vision Transformer includes an attention matrix, based on which the color distribution spectra of the regions of interest is obtained from the target image in the query set and the plurality of first images in the support set. Based on the obtained color distribution spectra, the second similarity between the target image and the first images of each category is determined. Thus, a weighted sum of the first similarity and second similarity of the first images corresponding to the same image category is calculated to obtain the image similarity.

Then, by sorting the image similarities, the image category is determined based on the image similarity with the largest value.

Here, the support set includes N classification labels, and each of the classification labels includes K first images, that is, the support set includes N×K first images. Then when obtaining the color distribution spectra of the first images, N×K color distribution spectra is obtained. Based on the N×K color distribution spectra, similarities of color distribution are determined, to obtain N×(K−1) color distribution similarities. Based on the N×(K−1) color distribution similarities, the second similarities between the target image and the first images of different categories are determine. Both N and K are any positive integer values.

It should be noted that when processing images through the image classification model, the image is first divided into blocks and embedded in positions through the embedding layer of the image classification model to obtain one-dimensional vectors corresponding to a plurality of image blocks. Then, the one-dimensional vectors corresponding to the plurality of image blocks are concatenated to flatten the one-dimensional vectors corresponding to the plurality of image blocks, to obtain the corresponding vector sequence of the image through the Transformer encoder, to determine the first similarities. Here, the Transformer encoder includes an attention matrix.

FIG. 2 is an explanation of the overall process of the present disclosure, and for the specific implementation, reference is made to the various embodiments mentioned above, which will not be repeated here.

Optionally, after determining the image category to which the target image belongs through the above embodiments, the process of image recognition, image segmentation, image detection, etc. is also carried out based on the determined image category. The present disclosure does not limit the subsequent processing process.

It should be noted that the above embodiments are the process of classifying images based on trained image classification models. Here, the image classification model is pre-trained, and the process of training the image classification model will be explained below.

When training the image classification model, a transfer learning method is used to pre-train an initial visual converter model with public sample images to obtain a visual converter model having preliminary image classification ability. Then the model training is continued based on specific small sample images and the trained visual converter model, to obtain an image classification model that is used to identify the image categories to which the small sample images belong. The specific model training process will be described in conjunction with several non-limiting embodiments.

In one embodiment, the process of training the image classification model is shown in FIG. 3. FIG. 3 is a flowchart illustrating training an image classification model according to an embodiment of the present disclosure. As shown in FIG. 3, the process of training the image classification model includes the following steps.

In step 301, a plurality of first sample images labeled with sample image categories are acquired.

Here, the first sample images are public sample images which is obtained with low difficulty. Optionally, images from a large dataset provided in the field is used as the first sample images. For example, images from a large-scale dataset such as ImageNet, ImageNet-21k, and JFT300M is used as the first sample images.

In step 302, the plurality of first sample images are input into an initial visual converter model, and predicted image categories of the plurality of first sample images are determined through the initial visual converter model.

Here, the Vision Transformer model includes an Embedding layer, Transformer Encoder, and a Multilayer Perceptron Head (MLP Head).

Taking the processing of any two first sample images as an example, the internal processing of the initial Vision Transformer will be illustrated.

Any two first sample images are input into the initial Vision Transformer, and through the Embedding layer of the initial Vision Transformer, these two first sample images are divided into a plurality of image blocks that match the preset image block size according to the preset image block size. Then, each image block is mapped into a one-dimensional vector using linear mapping to obtain the corresponding one-dimensional vector for each image block. Then these multiple one-dimensional vectors are concatenated separately to obtain sample vector sequences corresponding to these two first sample images.

These two sample vector sequences are input into the Transformer Encoder, and the Transformer Encoder is used to determine a cosine similarity between these two first sample images. The specific process is the same as the processing in step 1022, which will not be repeated here.

Based on the determined cosine similarity and the sample image category of one of the first sample images, the predicted image categories of these two first sample images are determined using MLP Head.

In step 303, the initial visual converter model is trained based on a first loss function indicating a difference between predicted image categories of the plurality of first sample images and sample image categories of the plurality of first sample images until a preset training completion condition is met, to obtain a trained visual converter model.

Here, the structure of the trained visual converter model is the same as that of the initial visual converter model, which also includes an embedding layer, converter encoder, and a multi head perceptron.

It should be noted that the process of training the model in step 302 and step 303 above is an iterative process, that is, after determining the predicted image category of a 1st first sample image, model parameters of the initial visual converter model are updated based on the first loss function indicating the difference between the predicted image category of the 1st first sample image and the sample image category of the 1st first sample image, to obtain the visual converter model after the first parameter update. A 2nd first sample image is further processed. After determining the predicted image category of the 2nd first sample image, the model parameters are further updated based on the first loss function indicating the difference between the predicted image category of the 2nd first sample image and the sample image category of the 2nd first sample image, to obtain the visual converter model after the second parameter update, and so on, until the preset training completion condition is met. The visual converter model that meets the training completion condition will be used as the trained visual converter model.

The training completion condition is that the first loss function meets a preset condition, or the number of iterations reaches a preset number, and so on, which is not limited by the present disclosure.

In step 304, the image classification model is acquired based on the trained visual converter model.

By using a large dataset with a large number of samples to pre-train the initial visual converter model, a visual converter model with image classification ability is obtained. However, the accuracy of the visual converter model in classifying specific small sample data is undesirable. Based on the small sample data, the initial image classification model obtained is further trained based on the visual converter model, to obtain an image classification model with high classification accuracy for specific small sample data, which can improve the classification accuracy of the image classification model trained through small sample learning, thereby improving the model training effect.

In one embodiment of the present disclosure, the above step 304 includes the following steps.

In step 3041, an embedding layer and a converter encoder are acquired from the trained visual converter model to form an initial image classification model.

In other words, the initial image classification model includes an embedding layer and a converter encoder.

In step 3042, a plurality of second sample images labeled with similarity truth values are acquired.

Here, the first sample images are small sample images that are difficult to obtain. Optionally, images from a small sample dataset provided in the field is used as the second sample images. For example, images from a miniImageNet dataset is used as the second sample images.

Optionally, the plurality of second sample images is directly used as the first images for subsequent image classification.

In step 3043, for any two second sample images among the plurality of second sample images, the two second sample images are input into the initial image classification model, and a first similarity prediction value of the two second sample images is output from the initial image classification model.

The process of step 3043 is the same as the process of determining the first similarity through the Embedding layer and Transformer Encoder in step 302 above. The specific process is seen in step 302 above, which will not be repeated here.

In step 3044, the initial image classification model is trained based on a second loss function indicating a difference between the first similarity prediction value and the similarity truth value.

It should be noted that the process of training the model in step 3043 and step 3044 above is an iterative process, that is, after determining the first similarity prediction value of a first pair of second sample images, the model parameters of the initial image classification model are updated based on the second loss function indicating the difference between the first similarity prediction value of the first pair of second sample images and the true similarity value of the first pair of first sample images, to obtain the image classification model after the first parameter update. A second pair of second sample images are further processed. After determining the first similarity prediction value of the second pair of second sample images, based on the second loss function indicating the difference between the first similarity prediction value of the second pair of second sample images and the true similarity value of the second pair of second sample images, the model parameters are further updated to obtain the image classification model after the second parameter update, and so on. The process of training the model is thus implemented based on the plurality of second sample images.

In one embodiment of the present disclosure, when training the initial image classification model, the second similarity prediction value determined based on the attention matrix of the initial image classification model is also combined to train the initial image classification model. That is to say, after performing step 3033 above, the model training process is also completed through steps 3045 to 3047 below.

In step 3045 a second similarity prediction result between the color distribution information of the target regions in two second sample images is determined based on an attention matrix of the initial image classification model.

For the specific process involved in step 3045, reference is made to steps 1031 and 1032 above, which will not be repeated here.

In step 3046, a second similarity prediction value is determined based on the second similarity prediction result and a preset similarity threshold.

In one possible implementation, if the second similarity prediction result is greater than the preset similarity threshold, the second similarity prediction value is determined as a first value.

In another possible implementation, when the second similarity prediction result is less than or equal to the preset similarity threshold, the second similarity prediction value is determined as a second value.

For the specific process involved in step 3046, reference is made to step 1031 above, which will not be repeated here.

In step 3047, the initial image classification model is trained based on a second loss function indicating a difference between a second similarity prediction value and a similarity truth value and a third loss function indicating a difference between the second similarity prediction value and the similarity truth value.

In one possible implementation, step 3047 includes the following steps:

In step 1, a weighted sum of the second loss function and the third loss function is calculated to obtain a target loss function based on a first initial weight corresponding to the second loss function and a second initial weight corresponding to the third loss function. In one possible way, the target loss function is determined by the following formula (3):

$$\text{Loss} = \alpha' \text{Loss}_1 30 \beta' \text{Loss}_2 \tag{3}$$

In the above formula (3), Loss represents the target loss function, Loss1 represents the second loss function, Loss2 represents the third loss function, $\alpha'$ represents the first initial weight, and $\beta'$ represents the second initial weight.

In step 2, the initial image classification model is trained based on the target loss function until a training completion condition is met to obtain the image classification model.

It should be noted that the process of training the model in steps 1 and 2 above is an iterative process, and the specific process of iterative processing is the same as the above content, which will not be repeated here.

It should be noted that when the model parameters of the initial image classification model are adjusted based on the target loss function, the values of the first initial weight and the second initial weight is also adjusted until a training completion condition is met, to obtain the first weight and the second weight used in the image classification process. The process of adjusting the values of the first initial weight and the second initial weight is also an iterative process.

It should be noted that the above model training process is performed by the server. After the model training is completed, the server deploys the trained image classification model to the terminal device used for image classification. It should be noted that if the computing device used for image classification is a server, the server can directly use the trained image classification model for image classification after the model training is completed.

Figure 4:
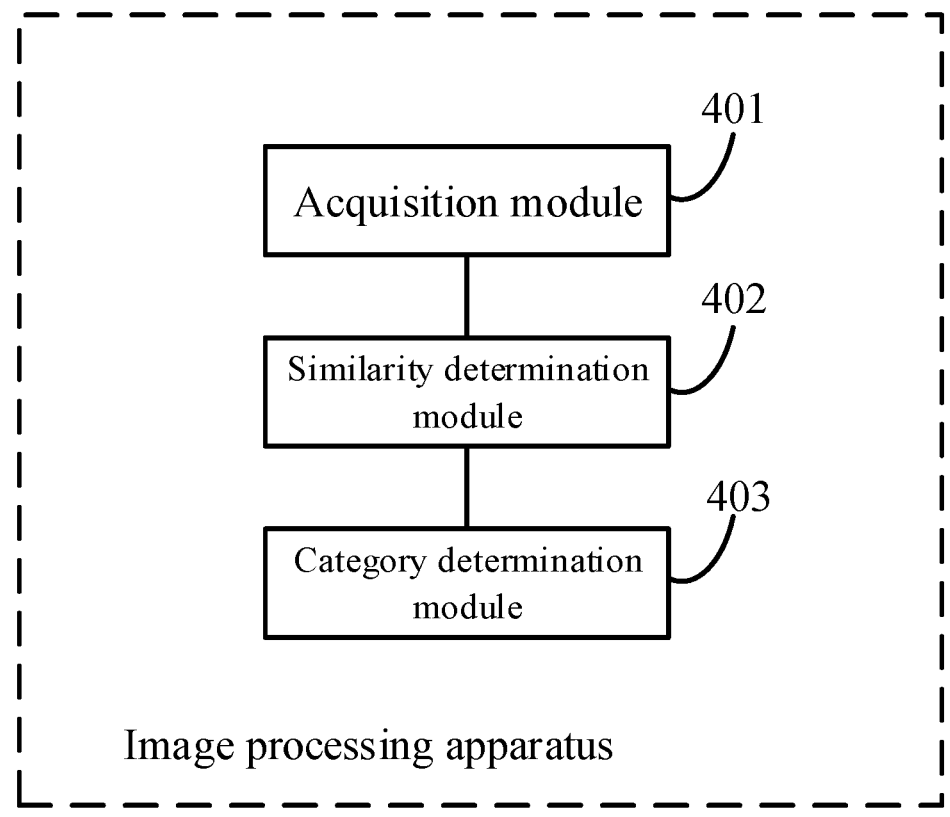
FIG. 4 is a block diagram illustrating an image processing apparatus according to an embodiment of the present disclosure.

The embodiment of the present disclosure also provides an image processing apparatus, as shown in FIG. 4. FIG. 4 is a block diagram illustrating an image processing apparatus according to an embodiment of the present disclosure. The apparatus includes:

an image acquisition module 401 configured to acquire a to-be-processed target image;

a similarity determination module 402 configured to determine first similarities between the target image and first images of categories based on a first feature vector corresponding to the target image and second feature vectors respectively corresponding to a plurality of first images, where the plurality of first images have been labeled with image categories, and the plurality of first images correspond to the plurality of image categories;

the similarity determination module 402 being further configured to determine second similarities between the target image and the plurality of first images based on first color distribution information of a target region in the target image and second color distribution information of target regions in the plurality of first images;

a category determination module 403 configured to determine an image category to which the target image belongs from the image categories of the plurality of first images based on the first similarities and the second similarities.

In one embodiment of the present disclosure, the color distribution information is a color distribution spectrum.

The similarity determination module 402, when being configured to determine second similarities between the target image and the plurality of first images based on first color distribution information of a target region in the target image and second color distribution information of target regions in the plurality of first images, is configured:

respectively determine a color distribution similarity between the first color distribution spectrum and each of the second color distribution spectra;

for at least one first image belonging to any one image category, determine a color distribution similarity with the largest value in the color distribution similarities corresponding to the at least one first image as a second similarity between the target image and the at least one first image.

In one embodiment of the present disclosure, the apparatus further includes:

a region determination module configured to determine target regions respectively from the target image and the plurality of first images based on an attention matrix of an image classification model;

an information acquisition module configured to acquire the first color distribution information of the target region in the target image, and the second color distribution information of the target region in each of the first images.

In an embodiment of the present disclosure, the first similarity is a cosine similarity, which is used to indicate a cosine distance between the first feature vector corresponding to the target image and the second feature vectors corresponding to the first images of each category.

The similarity determination module 402, when being configured to determine first similarities between the target image and first images of categories based on a first feature vector corresponding to the target image and second feature vectors respectively corresponding to a plurality of first images, includes a sequence determination submodule and a similarity determination submodule.

The sequence determination submodule is configured to determine a first vector sequence for representing the target image and a plurality of second vector sequences for representing the plurality of first images through an embedding layer of an image classification model based on the target image and the plurality of first images.

The similarity determination submodule is configured to obtain the first feature vector and the plurality of second feature vectors through an encoder of the image classification model based on the first vector sequence and the plurality of second vector sequences, and determine cosine similarities between the target image and the plurality of first images based on the first feature vector and the plurality of second feature vectors.

In one embodiment of the present disclosure, the similarity determination submodule, when being configured to obtain the first feature vector and the plurality of second feature vectors through an encoder of the image classification model based on the first vector sequence and the plurality of second vector sequences, and determine cosine similarities between the target image and the plurality of first images based on the first feature vector and the plurality of second feature vectors, includes a vector determination unit, a distance determination unit and a similarity determination unit.

The vector determination unit is configured to input the first vector sequence and the plurality of second vector sequences to the encoder, and through the encoder, determine the first feature vector corresponding to the first vector sequence and the plurality of second feature vectors corresponding to the plurality of second vector sequences.

The vector determination unit is further configured to determine a mean vector of the plurality of second feature vectors.

The distance determination unit is configured to determine a cosine distance between the first feature vector and the mean vector.

The similarity determination unit is configured to determine a cosine similarity between the target image and the plurality of first images based on the cosine distance.

In one embodiment of the present disclosure, the similarity determination unit, when being configured to determine the cosine similarity between the target image and the plurality of first images based on cosine distance, is configured to perform any one of:

when the cosine distance is greater than the preset distance threshold, determining the cosine similarity as a first value;

when the cosine distance is less than or equal to aa preset distance threshold, determining the cosine similarity as a second value.

In one embodiment of the present disclosure, the category determination module 403, when being configured to determine an image category to which the target image belongs from the image categories of the plurality of first images based on the first similarities and the second similarities, is configured to:

based on a first weight corresponding to the first similarity and a second weight corresponding to the second similarity, calculate a weighted sum of the first similarity and the second similarity to obtain an image similarity between the target image and the first images of each category;

determine an image category corresponding to a largest similarity of the target image among the image similarities as the image category to which the target image belongs.

In one embodiment of the present disclosure, the image classification model is pre-trained.

The apparatus further includes:

a sample acquisition module configured to acquire a plurality of first sample images labeled with sample image categories;

a sample category determination module configured to input the plurality of first sample images into an initial visual converter model, and determine predicted image categories of the plurality of first sample images through the initial visual converter model;

a training module configured to train the initial visual converter model based on a first loss function indicating a difference between predicted image categories of the plurality of first sample images and sample image categories of the plurality of first sample images until a preset training completion condition is met, to obtain a trained visual converter model;

a model acquisition module configured to acquire the image classification model based on the trained visual converter model.

In one embodiment of the present disclosure, the trained visual converter model includes an embedding layer, a converter encoder, and a multi head perceptron.

The model acquisition module, when being configured to acquire an image classification model based on the trained visual converter model, includes a model acquisition submodule, a sample acquisition submodule, a first prediction submodule, and a first training submodule.

The model acquisition submodule is configured to acquire an embedding layer and a converter encoder from the trained visual converter model to form an initial image classification model.

The sample acquisition submodule is configured to acquire a plurality of second sample images labeled with similarity truth values.

The first prediction submodule is configured to, for any two second sample images among the plurality of second sample images, input the two second sample images into the initial image classification model, and output a first similarity prediction value of the two second sample images from the initial image classification model.

The first training submodule is configured to train the initial image classification model based on a second loss function indicating a difference between the first similarity prediction value and the similarity truth value.

In one embodiment of the present disclosure, the model acquisition module further includes a result determination submodule, a second prediction submodule, and a second training submodule.

The result determination submodule is configured to determine a second similarity prediction result between color distribution information of the target regions in two second sample images based on an attention matrix of the initial image classification model.

The second prediction submodule is configured to determine a second similarity prediction value based on the second similarity prediction result and a preset similarity threshold.

The second training submodule is configured to train the initial image classification model based on a second loss function indicating a difference between the first similarity prediction value and the similarity truth value and a third loss function indicating a difference between the second similarity prediction value and the similarity truth value.

In one embodiment of the present disclosure, the second prediction submodule, when being configured to determine a second similarity prediction value based on the second similarity prediction result and a preset similarity threshold, is configured to perform any one of:

when the second similarity prediction result is greater than the preset similarity threshold, determining the second similarity prediction value as a first value;

when the second similarity prediction result is less than or equal to the preset similarity threshold, determining the second similarity prediction value as a second value.

In one embodiment of the present disclosure, the second training submodule, when being configured to the initial image classification model based on a second loss function indicating a difference between the first similarity prediction value and the similarity truth value and a third loss function indicating a difference between the second similarity prediction value and the similarity truth value, is configured to:

calculate a weighted sum of the second loss function and the third loss function to obtain a target loss function based on a first initial weight corresponding to the second loss function and a second initial weight corresponding to the third loss function;

train the initial image classification model based on the target loss function until a training completion condition is met to obtain the image classification model.

The implementation of the functions and effects of each module, submodule, and unit in the above apparatus have been described in detail in the corresponding steps of the above method, which will not be repeated here.

Since the apparatus embodiments substantially correspond to the method embodiments, a reference may be made to part of the descriptions of the method embodiments for the related part. The apparatus embodiments described above are merely illustrative, where the modules, submodules and units described as separate members may be or not be physically separated, and the members displayed as modules, submodules and units may be or not be physical units, e.g., may be located in one place, or may be distributed to a plurality of network modules. Part or all of the modules may be selected according to actual requirements to implement the objectives of the solutions in the description. Those of ordinary skill in the art may understand and carry out them without creative work.

Figure 5:
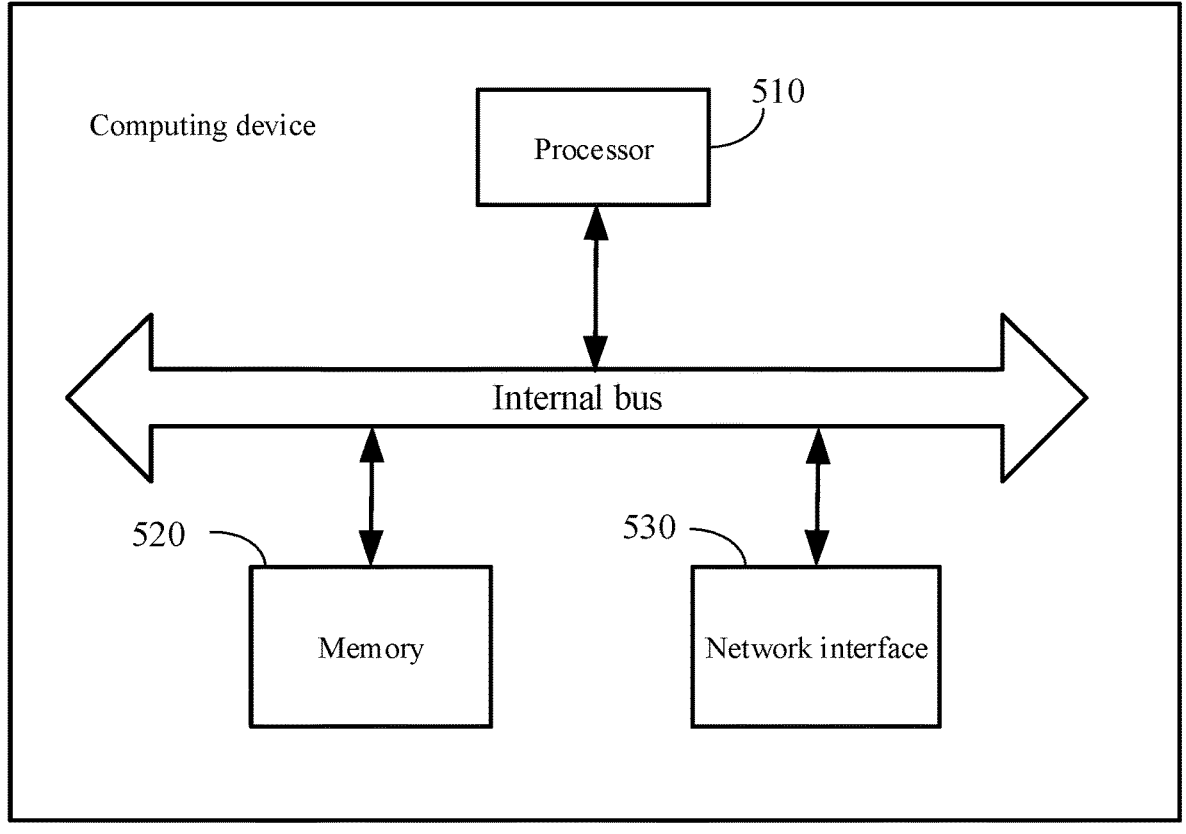
FIG. 5 is a structural schematic diagram illustrating a computing device according to an embodiment of the present disclosure.

The present disclosure also provides a computing device, as shown in FIG. 5, which is a structural schematic diagram illustrating a computing device according to an embodiment of the present disclosure. As shown in FIG. 5, the computing device includes a processor 510, a memory 520, and a network interface 530. The memory 520 is configured to store computer program code that can run on the processor 510. The processor 510 is configured to implement the image processing method provided by any one embodiment of the present disclosure when executing the computer program code, and the network interface 530 is configured to implement input and output functions. In more possible implementations, the computing device may also include other hardware, which is not limited by the present disclosure.

The present disclosure also provides a computer readable storage medium, which can be in various forms. For example, in different examples, the computer readable storage medium can be: a RAM (Random Access Memory), a volatile memory, a non-volatile memory, a flash memory, a storage drive (such as a hard drive), a solid-state hard drive, any one type of storage disk (such as an optical disk, DVD, etc.), or similar storage medium or a combination of them. Specifically, the computer readable medium can also be paper or other suitable medium that can print programs. A computer program is stored on a computer-readable storage medium, and the image processing method provided in any one embodiment of the present disclosure is implemented when the computer program is executed by the processor.

The present disclosure also provides a computer program product, including a computer program that implements the image processing method provided in any one embodiment of the present disclosure when executed by a processor.

In the present disclosure, the terms "first" and "second" are used to sever the description purpose and cannot be understood as indicating or implying relative importance. The term "a plurality of" refers to two or more, unless otherwise specified.

Other embodiments of the disclosure will be apparent to those skilled in the art from consideration of the specification and practice of the embodiments disclosed here. This application is intended to cover any one variations, uses, or adaptations of the disclosure following the general principles thereof and including such departures from the present disclosure as come within known or customary practice in the art. It is intended that the specification and examples be considered as exemplary, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure be limited by the appended claims.

What is claimed is:

1. An image processing method comprising:

acquiring a to-be-processed target image;

determining first similarities between the target image and first images of categories based on a first feature vector corresponding to the target image and second feature vectors respectively corresponding to a plurality of first images, wherein the plurality of first images have been labeled with image categories, and the plurality of first images correspond to the plurality of image categories;

determining second similarities between the target image and the plurality of first images based on first color distribution information of a target region in the target image and second color distribution information of target regions in the plurality of first images;

determining an image category to which the target image belongs from the image categories of the plurality of first images based on the first similarities and the second similarities.

2. The method according to claim 1, wherein the color distribution information is a color distribution spectrum; determining second similarities between the target image and the plurality of first images based on first color distribution information of a target region in the target image and second color distribution information of target regions in the plurality of first images comprises:

respectively determining a color distribution similarity between the first color distribution spectrum and each of the second color distribution spectra;

for at least one first image belonging to any one image category, determining a color distribution similarity with the largest value in the color distribution similarities corresponding to the at least one first image as a second similarity between the target image and the at least one first image.

3. The method according to claim 2, wherein prior to determining second similarities between the target image and the plurality of first images based on first color distribution information of a target region in the target image and second color distribution information of target regions in the plurality of first images, the method further comprises:

determining target regions respectively from the target image and the plurality of first images based on an attention matrix of an image classification model;

acquire the first color distribution information of the target region in the target image, and the second color distribution information of the target region in each of the first images.

4. The method according to claim 1, wherein the first similarity is a cosine similarity, which is used to indicate a cosine distance between the first feature vector corresponding to the target image and the second feature vector corresponding to the first images of each category;

determining first similarities between the target image and first images of categories based on a first feature vector corresponding to the target image and second feature vectors respectively corresponding to a plurality of first images comprising:

determining a first vector sequence for representing the target image and a plurality of second vector sequences for representing the plurality of first images through an embedding layer of an image classification model based on the target image and the plurality of first images;

obtaining the first feature vector and the plurality of second feature vectors through an encoder of the image classification model based on the first vector sequence and the plurality of second vector sequences, and determining cosine similarities between the target image and the plurality of first images based on the first feature vector and the plurality of second feature vectors.

5. The method according to claim 4, wherein obtaining the first feature vector and the plurality of second feature vectors through an encoder of the image classification model based on the first vector sequence and the plurality of second vector sequences, and determining cosine similarities between the target image and the plurality of first images based on the first feature vector and the plurality of second feature vectors comprising:

inputting the first vector sequence and the plurality of second vector sequences to the encoder, and through the encoder, determining the first feature vector corresponding to the first vector sequence and the plurality of second feature vectors corresponding to the plurality of second vector sequences;

for at least one first image belonging to any one image category, determining a mean vector of the second feature vectors corresponding to the at least one first image;

determining a cosine distance between the first feature vector and the mean vector, and determining a cosine similarity between the target image and the at least one first image based on the cosine distance.

6. The method according to claim 5, wherein determining a cosine similarity between the target image and the plurality of first images based on the cosine distance comprising any one of:

when the cosine distance is greater than a preset distance threshold, determining the cosine similarity as a first value;

when the cosine distance is less than or equal to the preset distance threshold, determining the cosine similarity as a second value.

7. The method according to claim 1, wherein determining an image category to which the target image belongs from the image categories of the plurality of first images based on the first similarities and the second similarities comprises:

based on a first weight corresponding to the first similarity and a second weight corresponding to the second similarity, calculating a weighted sum of the first similarity and the second similarity to obtain an image similarity between the target image and the first images of each category;

determining an image category corresponding to a largest similarity of the target image among the image similarities as the image category to which the target image belongs.

8. The method according to claim 1, wherein the image classification model is pre-trained;

a process of training the image classification model comprises:

acquiring a plurality of first sample images labeled with sample image categories;

inputting the plurality of first sample images into an initial visual converter model, and determining predicted image categories of the plurality of first sample images through the initial visual converter model;

training the initial visual converter model based on a first loss function indicating a difference between predicted image categories of the plurality of first sample images and sample image categories of the plurality of first sample images until a preset training completion condition is met, to obtain a trained visual converter model;

acquiring the image classification model based on the trained visual converter model.

9. The method according to claim 8, wherein the trained visual converter model comprises an embedding layer, a converter encoder, and a multi head perceptron;

acquiring the image classification model based on the trained visual converter model comprises:

acquiring an embedding layer and a converter encoder from the trained visual converter model to form an initial image classification model;

acquiring a plurality of second sample images labeled with similarity truth values;

for any two second sample images among the plurality of second sample images, inputting the two second sample images into the initial image classification model, and outputting a first similarity prediction value of the two second sample images from the initial image classification model;

training the initial image classification model based on a second loss function indicating a difference between the first similarity prediction value and the similarity truth value.

10. The method according to claim 9, further comprising:

determining a second similarity prediction result between color distribution information of the target regions in two second sample images based on an attention matrix of the initial image classification model;

determining a second similarity prediction value based on the second similarity prediction result and a preset similarity threshold;

training the initial image classification model based on a second loss function indicating a difference between the first similarity prediction value and the similarity truth value and a third loss function indicating a difference between the second similarity prediction value and the similarity truth value.

11. The method according to claim 10, wherein determining a second similarity prediction value based on the second similarity prediction result and a preset similarity threshold comprises any one of:

when the second similarity prediction result is greater than the preset similarity threshold, determining the second similarity prediction value as a first value;

when the second similarity prediction result is less than or equal to the preset similarity threshold, determining the second similarity prediction value as a second value.

12. The method according to claim 10, wherein training the initial image classification model based on a second loss function indicating a difference between the first similarity prediction value and the similarity truth value and a third loss function indicating a difference between the second similarity prediction value and the similarity truth value comprises:

calculating a weighted sum of the second loss function and the third loss function to obtain a target loss function based on a first initial weight corresponding to the second loss function and a second initial weight corresponding to the third loss function;

training the initial image classification model based on the target loss function until a training completion condition is met to obtain the image classification model.

13. A non-transitory computer-readable storage medium, wherein a program is stored on the computer-readable storage medium, and when the program is executed by a processor, the operations of the image processing method according to claim 1 is implemented.

14. A computing device, comprising a memory, a processor, and a computer program stored in the memory and capable of running on the processor, wherein the processor executes the computer program to implement operations:

acquiring a to-be-processed target image;

determining first similarities between the target image and first images of categories based on a first feature vector corresponding to the target image and second feature vectors respectively corresponding to a plurality of first images, wherein the plurality of first images have been labeled with image categories, and the plurality of first images correspond to the plurality of image categories;

determining second similarities between the target image and the plurality of first images based on first color distribution information of a target region in the target image and second color distribution information of target regions in the plurality of first images;

determining an image category to which the target image belongs from the image categories of the plurality of first images based on the first similarities and the second similarities.

15. The computing device according to claim 14, wherein the color distribution information is a color distribution spectrum; determining second similarities between the target image and the plurality of first images based on first color distribution information of a target region in the target image and second color distribution information of target regions in the plurality of first images comprises:

respectively determining a color distribution similarity between the first color distribution spectrum and each of the second color distribution spectra;

for at least one first image belonging to any one image category, determining a color distribution similarity with the largest value in the color distribution similarities corresponding to the at least one first image as a second similarity between the target image and the at least one first image.

16. The computing device according to claim 15, wherein prior to determining second similarities between the target image and the plurality of first images based on first color distribution information of a target region in the target image and second color distribution information of target regions in the plurality of first images, the operations further comprise:

determining target regions respectively from the target image and the plurality of first images based on an attention matrix of an image classification model;

acquire the first color distribution information of the target region in the target image, and the second color distribution information of the target region in each of the first images.

17. The computing device according to claim 14, wherein the first similarity is a cosine similarity, which is used to indicate a cosine distance between the first feature vector corresponding to the target image and the second feature vector corresponding to the first images of each category;

determining first similarities between the target image and first images of categories based on a first feature vector corresponding to the target image and second feature vectors respectively corresponding to a plurality of first images comprising:

determining a first vector sequence for representing the target image and a plurality of second vector sequences for representing the plurality of first images through an embedding layer of an image classification model based on the target image and the plurality of first images;

obtaining the first feature vector and the plurality of second feature vectors through an encoder of the image classification model based on the first vector sequence and the plurality of second vector sequences, and determining cosine similarities between the target image and the plurality of first images based on the first feature vector and the plurality of second feature vectors.

18. The computing device according to claim 17, wherein obtaining the first feature vector and the plurality of second feature vectors through an encoder of the image classification model based on the first vector sequence and the plurality of second vector sequences, and determining cosine similarities between the target image and the plurality of first images based on the first feature vector and the plurality of second feature vectors comprising:

inputting the first vector sequence and the plurality of second vector sequences to the encoder, and through the encoder, determining the first feature vector corresponding to the first vector sequence and the plurality of second feature vectors corresponding to the plurality of second vector sequences;

for at least one first image belonging to any one image category, determining a mean vector of the second feature vectors corresponding to the at least one first image;

determining a cosine distance between the first feature vector and the mean vector, and determining a cosine similarity between the target image and the at least one first image based on the cosine distance.

19. The computing device according to claim 18, wherein determining a cosine similarity between the target image and the plurality of first images based on the cosine distance comprising any one of:

when the cosine distance is greater than a preset distance threshold, determining the cosine similarity as a first value;

when the cosine distance is less than or equal to the preset distance threshold, determining the cosine similarity as a second value.

\* \* \* \* \*